(12) United States Patent
Pratt et al.

(10) Patent No.: US 7,252,311 B2
(45) Date of Patent: Aug. 7, 2007

(54) MOTOR DRIVEN LATCH

(75) Inventors: John D. Pratt, Laguna Niguel, CA (US); Timothy S. Rozema, Ladera Ranch, CA (US)

(73) Assignee: Hartwell Corporation, Placentia, CA (US)

( * ) Notice: Subject to any disclaimer, the term of this patent is extended or adjusted under 35 U.S.C. 154(b) by 260 days.

(21) Appl. No.: 10/944,132

(22) Filed: Sep. 17, 2004

(65) Prior Publication Data

US 2006/0038410 A1    Feb. 23, 2006

Related U.S. Application Data

(60) Provisional application No. 60/503,660, filed on Sep. 17, 2003.

(51) Int. Cl.
*E05C 19/12* (2006.01)
(52) U.S. Cl. .................. 292/113; 292/201; 292/247
(58) Field of Classification Search ............... 292/246, 292/247, 109, 113, 201
See application file for complete search history.

(56) References Cited

U.S. PATENT DOCUMENTS

| | | | | | |
|---|---|---|---|---|---|
| 2,714,032 | A | * | 7/1955 | Summers | 292/247 |
| 3,815,942 | A | * | 6/1974 | White | 292/113 |
| 3,888,528 | A | * | 6/1975 | Jericijo | 292/256.5 |
| 4,828,299 | A | * | 5/1989 | Poe | 292/139 |
| 4,951,979 | A | * | 8/1990 | Escaravage | 292/110 |
| 5,921,593 | A | * | 7/1999 | Gassert | 292/144 |
| 6,042,174 | A | * | 3/2000 | Durrani | 296/121 |
| 6,325,428 | B1 | | 12/2001 | Do | 292/113 |

* cited by examiner

*Primary Examiner*—Gary Estremsky
(74) *Attorney, Agent, or Firm*—Barnes & Thornburg LLP

(57) ABSTRACT

A latch system including a first portion and a second portion which are attached to corresponding pieces. The first portion is engageable with the second portion. A drive device is coupled to at least one of the first portion and the second portion for controllable operation of the device to engage and disengage the first portion and second portion. A controller is provided and coupled to the drive device for controllably operating the drive device to engage and disengage the latch. The first and second portion may be provided in the form of a hook and keeper configuration with one of the hook portion and keeper portion being driven by the drive device. A sensor may be provided on the latch assembly coupled to the controller for detecting at least one condition such as the latch being engaged or the latch being disengaged. Also disclosed is a method of latching using a first portion, second portion, drive device and controller for controllably latching and unlatching a latch assembly.

12 Claims, 5 Drawing Sheets

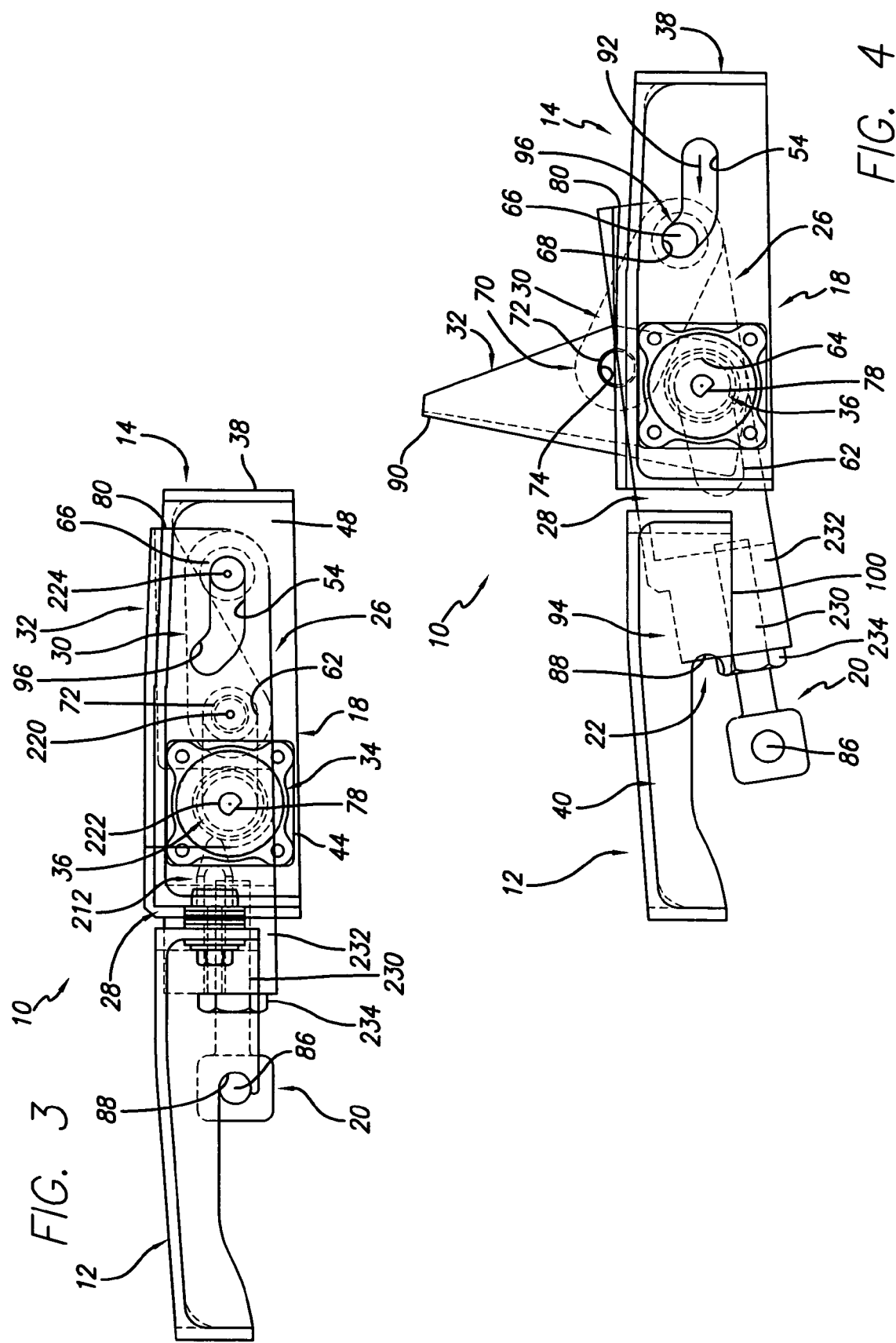

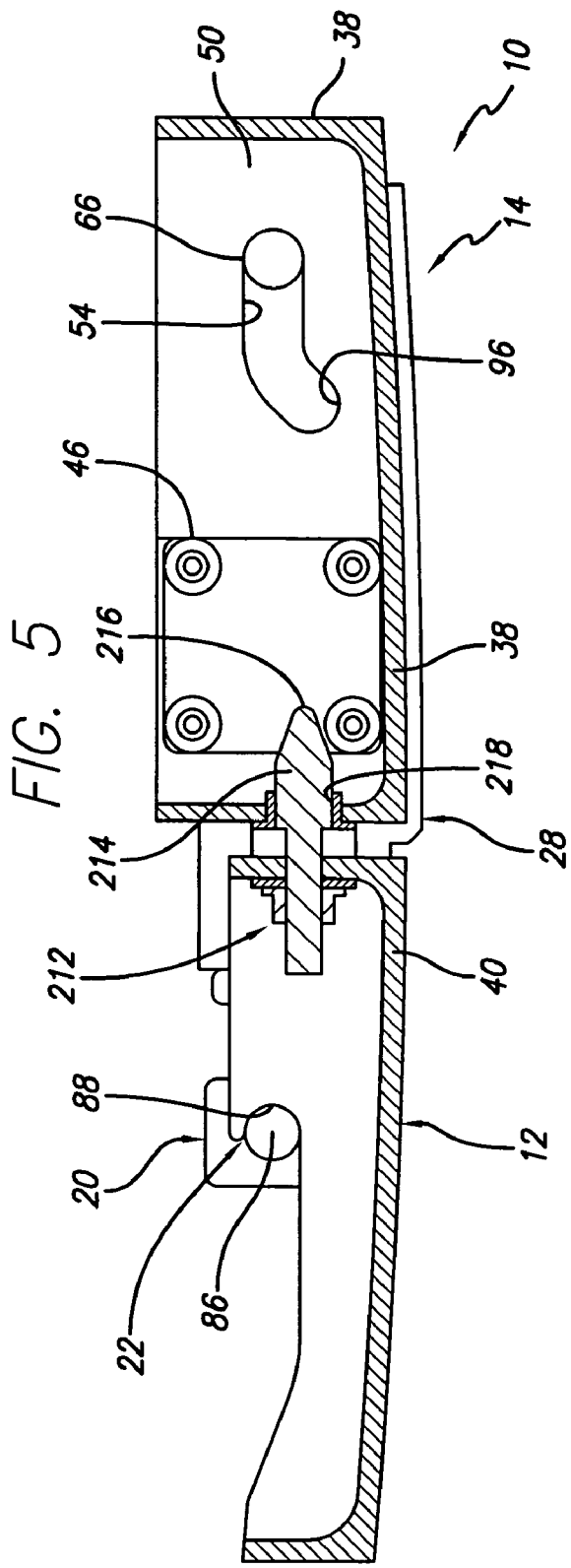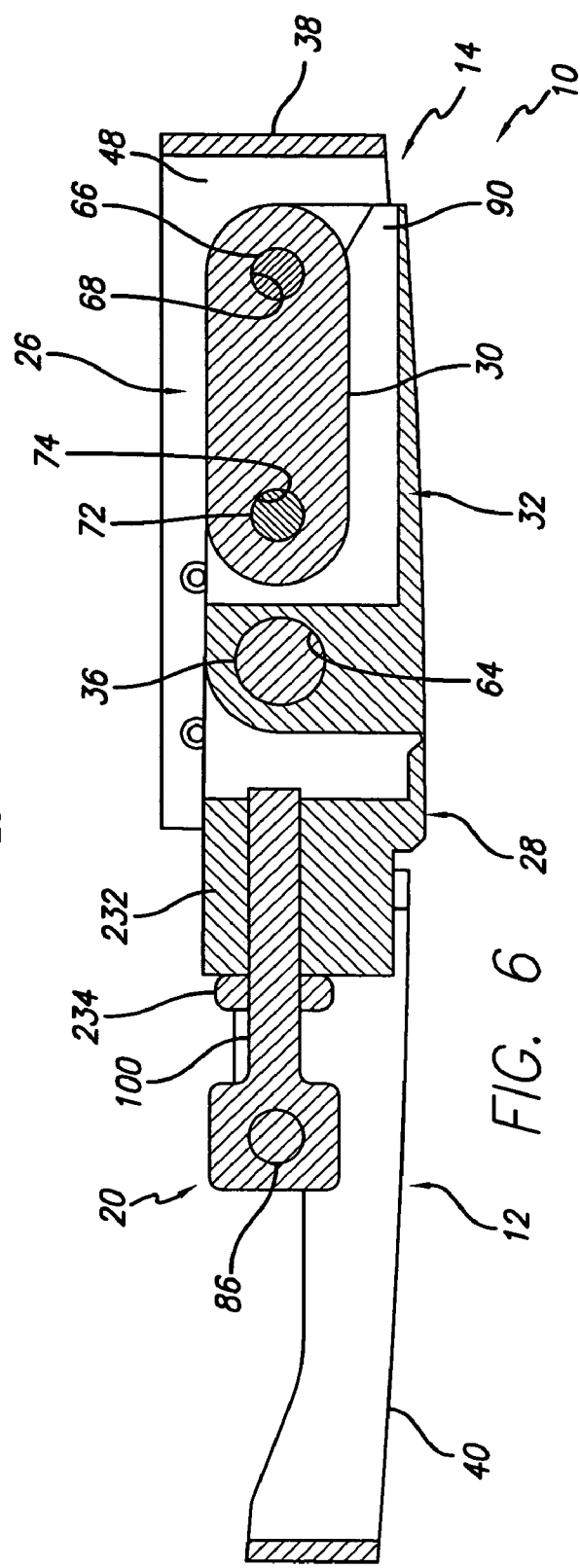

MOTOR DRIVEN LATCH

BACKGROUND

This application claims the benefit of U.S. Provisional Application No. 60/503,660, filed Sep. 17, 2003.

This disclosure relates to latches for use in aerospace applications such as those used on aircraft or other vehicles to hold portions of a housing in a closed position.

Many latch systems are available for holding portions of structures in a closed position even when the structures are subjected to significant forces. One example, which is not limiting on the present application, is the use of such latches in the aerospace industry. The aerospace industry latch may be used to hold the housing portions of an engine nacelle in the closed position around the engine mechanisms. The latch systems undergo significant forces and must be designed to hold the portions of the nacelle in a closed position during operation. Additionally, the latches must be operable so that the nacelles can be opened for access to the engine mechanism.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

BRIEF DESCRIPTION OF THE DRAWINGS

FIG. 3 is a side elevational view of the latch as shown in FIG. 2 taken along line 3—3 in FIG. 2 in which the latch has been operated to a closed position in which a hook portion is engaged with a keeper portion;

FIG. 4 is the side view of FIG. 3 in which the latch has been operated to disengage a bolt from a corresponding retaining portion of a keeper; in other words, the latch has been operated to an open position in which the hook portion has been disengaged from the keeper portion;

FIG. 5 is a cross-sectional view taken along line 5—5 in FIG. 2;

FIG. 6 is a cross-sectional view taken along line 6—6 in FIG. 2;

DETAILED DESCRIPTION

Figure 1:
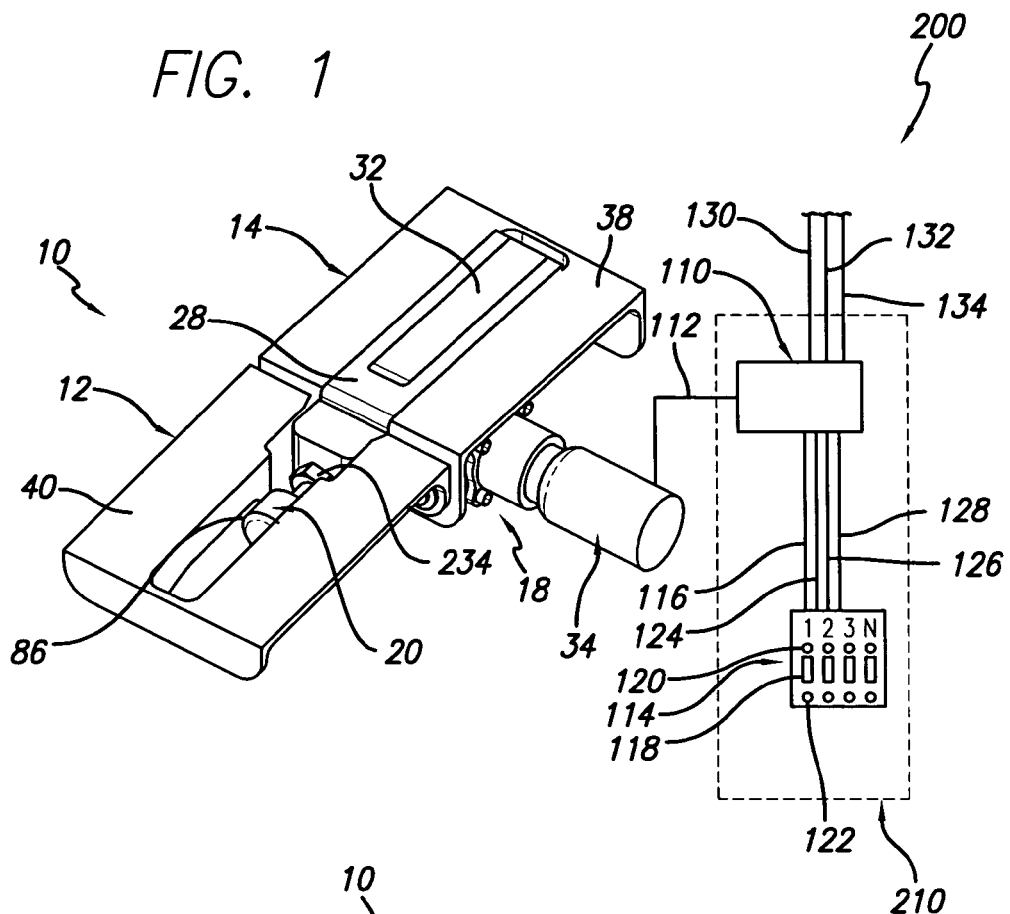
FIG. 1 is a perspective view of a motor drive latch set forth in the disclosure separated from structures to which it would be attached for retaining the structures in a closed position and providing a diagrammatic illustration of an associated control assembly.

While the present disclosure may be susceptible to embodiment in different forms, there is shown in the drawings, and herein will be described in detail, an embodiment with the understanding that the present description is to be considered an exemplification of the principles of the disclosure and is not intended to limit the disclosure to the details of construction, methods and the arrangements of components set forth in the following description or illustrated in the drawings.

Figure 7:
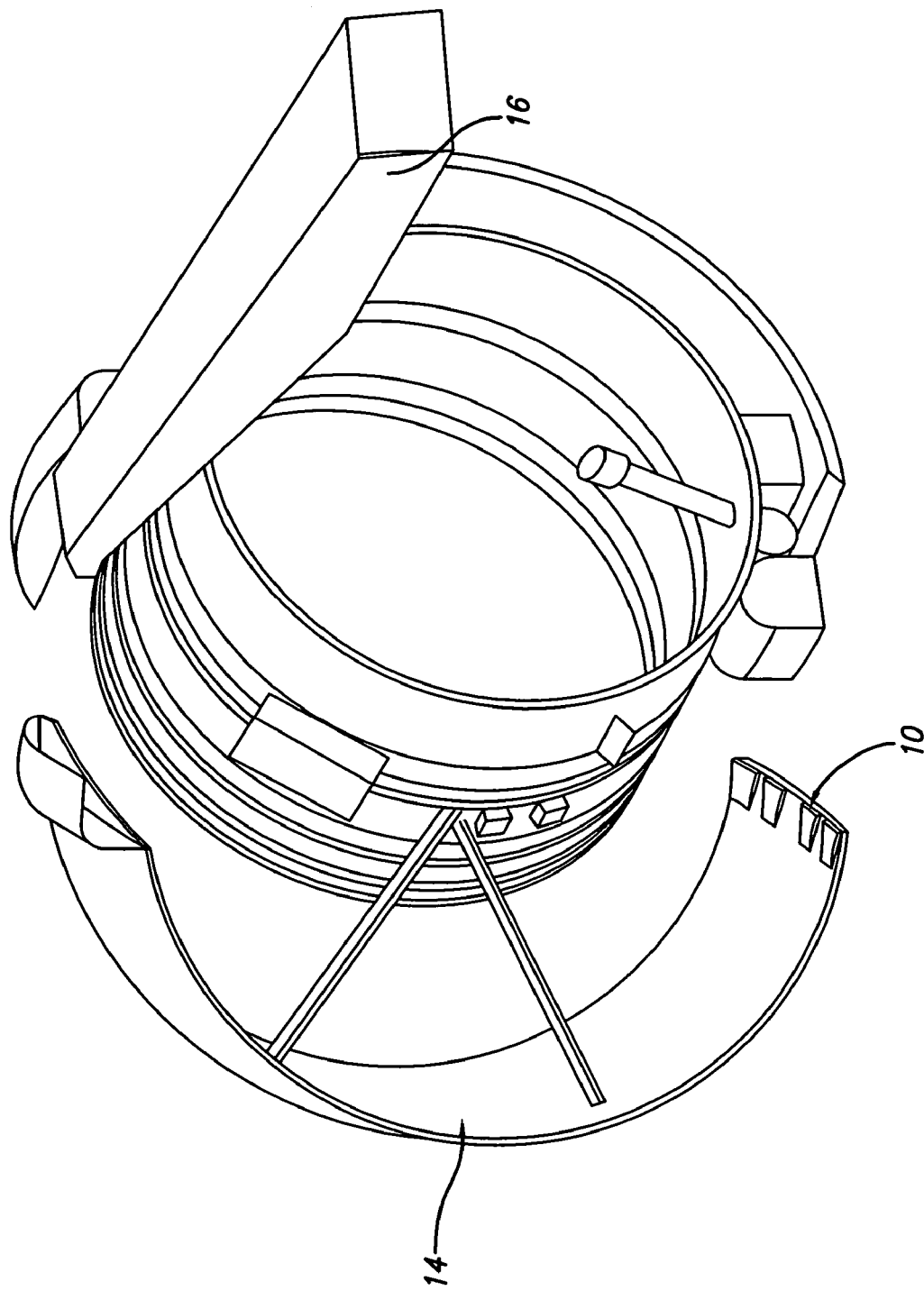
FIG. 7 is a simplified view of a portion of fan cowls from above an engine, showing latch assemblies carried on the cowls.

As shown in FIG. 1, a latch assembly 10 is provided. The latch assembly includes a first portion shown as a hook portion 14 and a second portion shown as a keeper portion 12. The first and second portions are attachable to corresponding first and second pieces such as a cowling and structure shown in FIG. 7. The keeper 12 and hook 14 portions are retained on separate bodies such as a nacelle and a corresponding structure on an aircraft cowling. With reference to FIG. 7 such a cowling 14 and other corresponding structure such as an engine forward mount 16 are illustrated. The latch assembly 10 is shown positioned on an edge of the cowling 14 to retain the cowling when in a closed position.

The hook portion includes a drive device 18 which is motorized and controllably operates a bolt 20. With reference to FIGS. 3–6 the bolt 20 can be controllably operated by the drive device 18 to engage and disengage a retaining portion 22 of the keeper 12.

The bolt 20 is connected to the drive device 18 by a linkage 26. The linkage 26 includes a translating hook body 28, a rear latch link 30 and a forward latch link 32. The drive device 18, by way of example but not limitation, includes a controllable electric motor 34 in the form of a high torque AC induction gear motor and a drive shaft 36 extending from the motor 34. It is contemplated that other forms of controllable drive devices are included, such as those which operate pneumatically or hydraulically.

Figure 8:
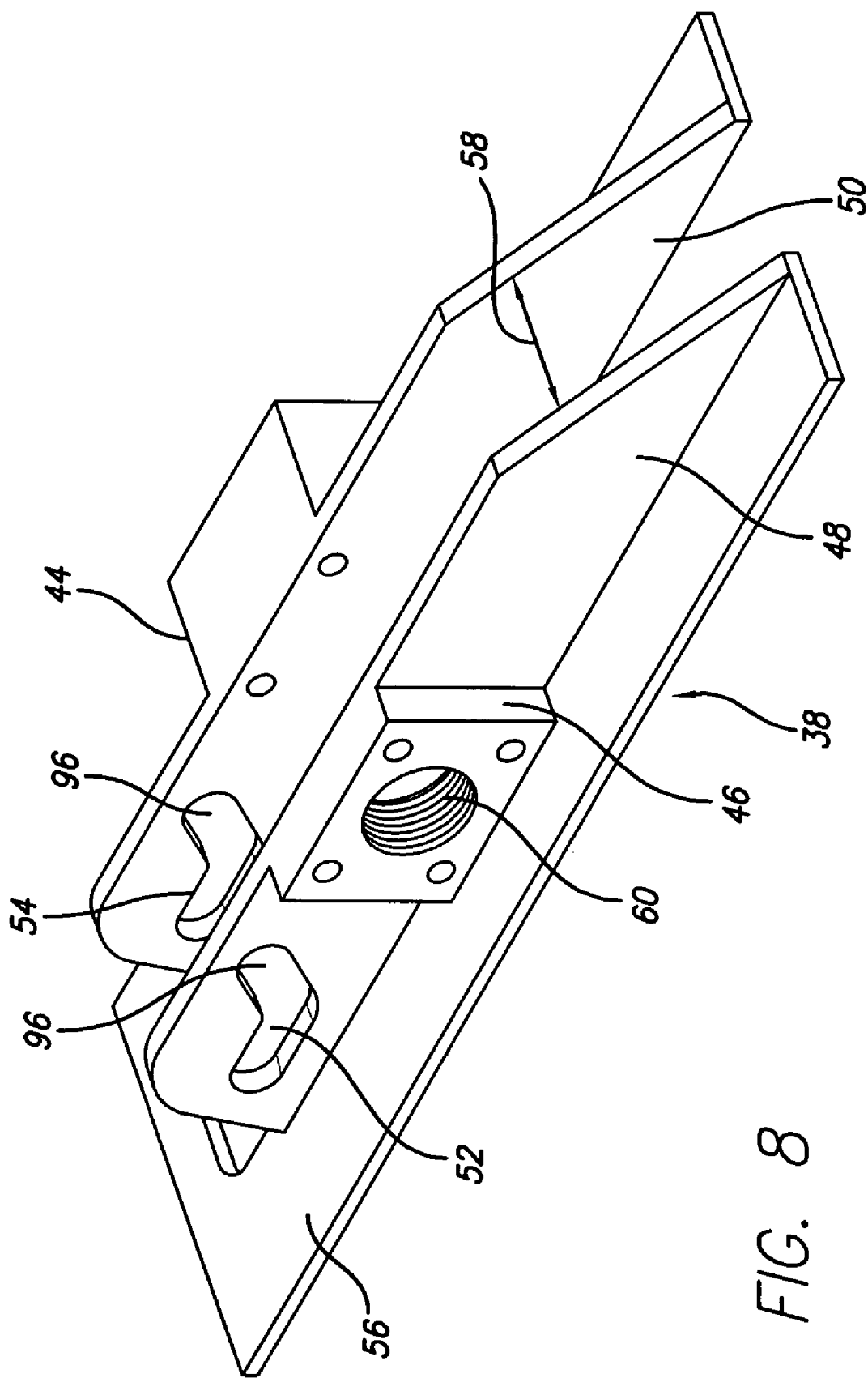
FIG. 8 is a perspective view of a housing used in the latch assembly.

A latch housing 38 is included in the hook portion 14. Similarly, the keeper portion 12 includes a keeper housing 40. The linkage 26 is carried on the latch housing 38. With reference to FIG. 8, the latch housing 38 is shown from a bottom perspective view. As shown, the housing 38 includes a motor mounting base 44 an opposing shoulder 46 and two generally parallel extending sidewalls 48, 50. The perspective view of the housing 38 shown in FIG. 8 is shown without the other components of the latch assembly 10 in the interest of providing clarity as to the structures and functions of the housing 38. A pair of guide slots 52, 54 are provided in the corresponding walls 48, 50, respectively. A face plate or flange 56 extends from and between the walls 48, 50. A space 58 is defined between the opposing side walls defining a latch channel 58 there between.

Figure 2:
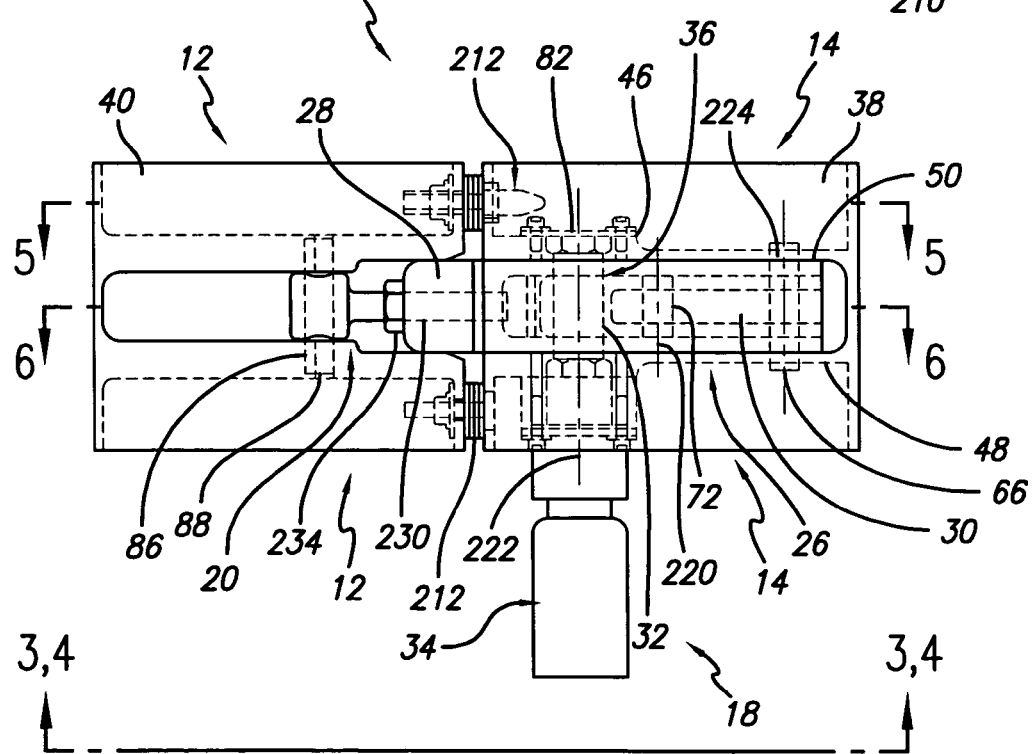
FIG. 2 is a top plan view of the latch as shown in FIG. 1.

The linkage 26 is carried on and relative to the latch housing 38 generally positioned in the channel 58. The motor 34 attaches to the motor base 44 with the shaft 36 extending through a bore 60 formed in the motor base 44 and hub 46. With reference to at least FIGS. 2–4, the shaft 36 extends through an elongated slot 62 in the translating hook body 28. As noted above, the translating hook body 28 is generally operatively positioned in the channel 58. Similarly, the shaft 36 extends through a bore 64 in the forward link 32. The rear link 30 includes a pin 66 retained in a bore 68 of the rear link 30. The pin 64 travels through the pair of opposing guide slots 52, 54. Opposing end 70 of the rear link 30 includes a pin 72 which extends through a bore 74 in the link 30 and in a corresponding bore in the forward link 32.

With the foregoing construction of the linkage assembly 26 in mind, the rear link 30 is slidably connected to the body 38 of the pin 66 in the slots 52, 54. The rear link 30 is connected to the forward link 32 at the pin 72. The forward link 32 is connected to the shaft 36. It should also be noted that the shaft 36 is keyed 78 to the forward link 32. As such rotation of the shaft 36 causes movement of the forward link 32. The translating hook body 28 is connected to the body 38 by the shaft 36 which also positions it in operating relationship with the forward link 32. Additionally, a distal end 80 of the hook body 28 is coupled proximate to the rear link 30 by the pin 66 extending through a corresponding portion of the hook body 28.

The structure and connection relationships of the latch assembly 10 having been described herein above, we will now review the motorized or automatic operation of the latch assembly 10. As noted above, the latch assembly 10 is driven by a drive assembly 18. By way of review, the drive assembly includes the motor 34 and the drive shaft 36 carried on the housing 38. As also noted above, the drive shaft 36 is associated with the hook body 28 and the forward link 32. As also shown in the drawings, one end of the shaft 36 is coupled to the motor 34 which drives the shaft 36. An opposing end of the shaft 36 is carried in a bearing assembly 82 carried on the hub 46 (See, FIG. 8). As noted, the forward link 32 is keyed 78 to the shaft 36.

FIG. 3 shows the latch assembly 10 in a closed or latched condition. In the latched condition, the outwardly extending arms 86 of the T-configuration bolt 20 engage opposed, correspondingly formed recesses 88 of the retaining portion 22 in the keeper body 40. In this condition, power is terminated to the motor 34 thereby preventing disengagement of the latch. When the motor 34 is operated to disengage the bolt 20 from the retaining portion 22, the shaft is rotated (generally in a counter clockwise direction for purposes of the illustration in FIG. 4) thereby moving the forward link 32 towards the keeper 12. Rotation of the forward link 32 causes movement of the forward link 32 upwardly out of the channel 58 with an end 90 extending away from the latch body 38.

Movement of the forward link 32 causes movement of the inner link 30 which is coupled thereto by the pin 72. Generally, the pin 72 rotate at a radial position from the shaft 36 causing movement of the link 30 attached thereto.

Movement of the link 30 also causes movement of the translating hook body 28 operatively associated with the rear link 30 by means of the pin 66 operating in the slots 52, 54. Movement of the rear link 30 towards the keeper 12 causes translational movement of the hook body 28 first in a generally axial direction (as indicated by arrow 92) and secondarily in a rotary motion (as indicated by arrow 94). The rotary motion of the translating hook body 28 is caused by movement of the pin 66 in the slot first in the axial direction (92) and then in the upward direction in a second portion (96) of the slots 52, 54. The axial motion 92 causes axial displacement of the arms 86 outwardly and away from the corresponding recesses 88. The rotary motion 94 causes displacement of the arms 86 away from the recesses 88 to a degree that allows the arms 86 to clear an edge 100 of the keeper body 12 when the keeper 12 and latch portion 14 are separated or displaced away from each other. The elongated slot 62 and the guide slots 52, 54 facilitate translational motion of the hook body 28 as described above.

The operation of the motor 34 is designed to stop at the open position (for example as shown in FIG. 4) or in the closed position (as shown in FIG. 3). A controller 110 (FIG. 1) is coupled 112 to the motor 34. The controller 110 is shown diagrammatically in FIG. 1. The controller 110 includes circuitry that will terminate power upon completion of each half-cycle operation (i.e., open or unlatched, and closed or latched). This will provide additional reliability and safety such that in the latched position the latch assembly 10 cannot be unlatched until power is provided to the motor 34. When power is provided to unlatch the assembly the tip 90 or flag extending from the latch assembly 10 will indicate the unlatched condition. It is anticipated that the tip 90 or the entire forward link 32 will be painted or otherwise colorized to provide indication of the unlatched condition. The stroke of the motor 34 is controlled by the controller 110 and the associated limit switches and sensors that will stop the motor when the latch is either fully opened or fully closed. The limit switches and sensors will signal the operator, by an appropriate sensory signal such as an audio signal, visual signal, visual display or other signal, which might be displayed at a control panel 114 and connected 116 to the controller 110. Signals will indicate to the operator that the open/close sequence is complete. The control panel 114 may include a series of control switches 118 and appropriate open 120 and closed 112 indicator lights, for example, but not limited to, colored red for open and green for closed.

It is expected that an embodiment may include a plurality of latch assemblies and associated drive devices being operated by a common controller. In other words, one controller may be used to controllably operate a plurality of latch assemblies. The controller may be placed in a location convenient to the operator which may be spaced from the latch assemblies.

The indicator lights 120, 122 in the form of LEDs are powered by latch-mounted proximity sensors which will provide verification of the latch status (fully open, or fully closed). The control panel 114 located behind a triggerlocked cover which may also include a key lock or other appropriate locking device as protection from the elements and inadvertent activation. The control panel can be located at a defined distance off the ground, for example, but not limited to, 5 feet above the ground which facilitates easy access by a service technician or other operator that may be positioned remote from the latch assembly 10.

The use of the motor 34 is envisioned to eliminate the need for actual manual positioning of an operator proximate to the latch for each latching and unlatching operation. Rather, the control panel 114 can include a plurality of controls connected, 116, 124, 126, 128 with the controller 110 to operate multiple latch assemblies by connections 112, 130, 132, 134.

An example of a suitable motor 34 is a 115 VAC 400 Hz induction gear motor having a 10,000:1 reduction ration and continuous torque rating of 123 in/lb. The stall torque on such a motor may be in excess of 250 in/lb. The output speed of such a motor may be 2.2 RPM which will open or close the latch assembly 10 in approximately 4.5 seconds. Such a motor may also be generally light weight on the order of 12 ounces and include such additional reliability features as double-shielded life-lubricated ball and needle bearings and provide a life of approximately 200–1,000 hours of continuous duty which is approximately equal to 72,000 full cycles, minimum.

The latch system 10 as shown and described above provides a low profile configuration hook latch assembly 10 which incorporates additional safety and reliability features. The operation of the latch to the open or closed position provides an additional safety feature. The safety features associated with the controller 110 and associated control devices 114 and sensing devices provides additional reliability and safety. Additionally, the structure of the latch 10 and overall latch system 200 incorporating the control assembly 210 provides benefits in addition to the remote controllability. For example, the use of the control assembly 10 helps eliminate weight associated with additional mechanical cabling associated with hardware. The combination of the control assembly 210 and the associated connections to the latch assembly 10 have a total weight which is less than the mechanically connected latch assemblies of prior art designs. This results in a net weight loss for the overall latching system 200. The sensors used to indicate the proximity of the latch devices 12, 14 to indicate a closed or open condition envisioned as incorporating inductive proximity switches (IFM Effector, Inc.). It is envisioned that the solid state devices will maximize reliability and survivability within the harsh engine cowl environment.

As additional feature, the keeper 12 includes at least one and, as illustrated, a pair of latch shear pins in a shear pin assembly 212. With reference to FIG. 5, the shear pin assembly 212 includes a shear pin 214 attached to and carried on the keeper housing 40. A forward end 216 of the pin 214 extends through a passage 218 on the latch housing 38. The shear pin 214 helps to align the portions 12, 14 and facilitates reliable and repeatable engagement of the arms 86 of the bolt 20 in the corresponding recesses 88 of the retaining portion 22 and resist shearing action between the portions 12, 14.

Additionally, the latch 10 employs a double link (the forward link 32 and rearward link 30) over-center locking configuration to help retain the bolt in engagement with the keeper. The linkage 26 including the links 32, 30 produce an over-center locking condition such that a central axis 220 of the pin 72 falls below a line extending from a central axis 222 of the shaft 36 and a central axis 224 of the pin 66 when the linkage 26 is in the latched condition.

It should also be noted that the bolt 20 can be adjusted relative to the hook body 28 to facilitate setting a desired preload and bolt 20 position. The bolt 20 includes a threaded shank 230 threadedly carried in a base 232 and an adjustment for lock nut 234. Adjustment of the threaded shaft 230 in the base 232 can be achieved by the lock nut 234 maintaining the desired adjustment. No adjustment is required on the keeper side (12) of the latch assembly 10.

In use, the latch assembly 10 is attached either alone or with other latches of the same configuration or other configurations to portions of a desired structure such as, by way of example but not limitation, the cowl structure on an engine nacelle. The keeper portion 12 being attached to one portion of the structure and the latch portion 14 being attached to an opposing portion of the structures. Control assembly 210 should be positioned in a convenient location for operation by a user. The location of the control assembly 210 can be positioned spaced away from but in communication with the one or several latch assemblies 10 operated by the control panel 114. In the closed configuration, the motor 34 is rotated to operate the shaft 36 resulting in movement of the latch body to engage the bolt 20 with the retaining portion 22 of the keeper 12.

Actuation of the control panel 114 signals the controller 110 to operate the motor 34 to disengage the bolt 20 from the retaining assembly 22. Operation of the motor 34 rotates the shaft 36 thereby operating the linkage assembly 26 to disengage the links 28, 30, 32 and disengage the over-center configuration of the linkages. Operation of the linkages continues until the fully opened conditioned is achieved at which point the power is terminated to the motor 34. In the fully disengaged configuration (see FIG. 4) a tip 90 of the forward link 32 extends from the latch body 14 providing an indicator or flag. It is also contemplated that another form of visual indicator may be included which has a light or auditory signal to indicate to the operator of the control panel 114 that the latch assembly 10 is unlatched. Additional signals can be provided at the control panel in the form of opened and closed signals 120, 122 such as by means of an LED or other signal including auditory signals.

Proximity sensors on the motor and shaft as well as on the portions 12, 14 can provide information to the controller 110 to provide status of the latch either in the locked or unlocked condition. The sensors can be configured to provide redundant information so as to improve the reliability and safety of the latch assembly 10.

The use of the motor 34 with the latch assembly 10 provides a weight reduction factor compared to latches which are mechanically operated by remote latching mechanical cables or hydraulics. It should be noted that the reference to the communication between the control panel 114, controller 110 and the latch assembly 10 is achieved through communication paths that may include hard-wired connections, optical connections, wireless connections and any other form by which the various components can be connected for communicating information to and from various connected components. Additionally, in an embodiment of this device signals can be repeated to other devices such as computers, controllers and related systems for purposes of accountability, safety and interaction with other systems.

It should be noted that the reference to the communication between the control panel 114, controller 110 and the latch assembly 10 is achieved through communication paths that may include hardwired connections, optical connections, wireless connections and any other form by which the various components can be connected for communicating information to and from various connected components. Additionally, in an embodiment of this device signals can be repeated to other devices such as computers, controllers and related systems for purposes of accountability, safety and interaction with other systems.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A latch assembly comprising:
   a first portion defining a hook attached to a first piece and a second portion defining a keeper attached to a second piece, the first portion being engageable with the second portion, the first portion defining a hook portion having a bolt for controllable engagement with the keeper portion;
   a linkage carried on the hook portion, the linkage being coupled to the hook portion for providing translational movement relative to the keeper portion, the linkage having an overcenter configuration for retaining engagement of the first portion with the second portion;

a drive device coupled to at least one of the first portion and the second portion for controllable operation of the drive device to engage and disengage the first portion and the second portion;

an electronic controller coupled to the drive device for electronically controllably operating the drive device to engage, lock, unlock and disengage the first and second portions, the electronic controller terminating power to the drive device upon completion of locking the first and second portions; and further comprising a slot in a link in the linkage, a pin in the slot, the pin being coupled to the bolt wherein movement of the pin in the slot translates into movement of the bolt.

2. The latch assembly of claim 1 further wherein the overcenter configuration retains the bolt in engagement with the keeper portion.

3. The latch assembly of claim 1 further comprising the drive device being operable by the controller for operating between an open position in which the hook portion is disengaged from the keeper portion and a closed position in which the hook portion is engaged with the keeper portion.

4. The latch assembly of claim 1 further comprising the controller being coupled to a plurality of drive devices in a plurality of latch assemblies.

5. The latch assembly of claim 1 further comprising a forward latch link coupled to the linkage, the linkage operating the forward latch link to advance from the hook portion when the hook portion is disengaged from the keeper portion and for returning into the hook portion when the hook portion is engaged with the keeper portion.

6. The latch assembly of claim 1 further comprising at least one shear pin carried on at least one of the first portion and the second portion, a corresponding shear pin passage carried on the other of the first portion and the second portion corresponding to the location of the shear pin for receiving the shear pin when the first portion is engaged with the second portion.

7. The latch assembly of claim 1 further comprising at least one sensor carried on the latch assembly and coupled to the controller for detecting at least one of the first portion and second portion being engaged and the first portion and second portion being disengaged.

8. The latch assembly of claim 1 further comprising at least one sensor coupled with the drive device for detecting condition of the drive device.

9. The latch assembly of claim 8 further comprising using the condition of the drive device to represent the condition of the first portion and second portion being engaged and the first portion and second portion being disengaged.

10. The latch assembly of claim 1 further comprising the drive device being a controllable electric motor generally operable between a first position in which the first portion is engaged with the second portion and a second position in which the first portion is disengaged from the second portion.

11. The latch assembly of claim 10 further comprising the controller coupled to the electric motor and operating the electric motor so as to terminate power to the electric motor upon operation to the first position and the second position.

12. The latch assembly of claim 1 further comprising the slot has a curved portion.

* * * * *